United States Patent [19]

Sanchez

[11] 4,301,131
[45] Nov. 17, 1981

[54] OXIDATION OF PHOSPHORIC ACID PLUS K COMPOUND ADDITION

[75] Inventor: Moisés G. Sánchez, Severna Park, Md.

[73] Assignee: W. R. Grace & Co., New York, N.Y.

[21] Appl. No.: 210,772

[22] Filed: Nov. 28, 1980

[51] Int. Cl.³ .............................................. C01B 25/16
[52] U.S. Cl. .................................. 423/321 R; 423/317
[58] Field of Search .................... 423/321 R, 320, 317

[56] References Cited

U.S. PATENT DOCUMENTS

| | | | |
|---|---|---|---|
| 2,799,557 | 7/1957 | Seyfried et al. | 23/109 |
| 2,968,528 | 1/1961 | Tuttle et al. | 23/165 |
| 3,310,374 | 3/1967 | Posey et al. | 23/165 |
| 3,338,675 | 8/1967 | Gilbert | 423/321 R |
| 3,845,198 | 8/1974 | Marcot | 423/633 |
| 3,907,680 | 9/1975 | Hill | 210/71 |
| 4,044,108 | 8/1977 | Kikuchi et al. | 423/321 S |
| 4,048,289 | 9/1977 | Pierres | 423/317 |
| 4,110,422 | 8/1978 | Hill | 423/321 R |
| 4,164,550 | 8/1979 | Hill | 423/321 R |
| 4,209,497 | 6/1980 | Irani et al. | 423/321 R |

FOREIGN PATENT DOCUMENTS

| | | |
|---|---|---|
| 617322 | 3/1961 | Canada . |
| 2813755 | 4/1979 | Fed. Rep. of Germany ... 423/321 R |

OTHER PUBLICATIONS

U.S. Ser. No. 427,383, 12-21-73, Pierres.

*Primary Examiner*—O. R. Vertiz
*Assistant Examiner*—Gregory A. Heller
*Attorney, Agent, or Firm*—Charles L. Harness

[57] ABSTRACT

This invention is directed to an improvement in the Hill phosphoric acid process, whereby the Hill process can be used with high-iron phosphate rock. The improvement involves oxidation of divalent iron in an early stage of the Hill process, followed by addition of a soluble potassium compound to the acid in the crystallizer.

11 Claims, 1 Drawing Figure

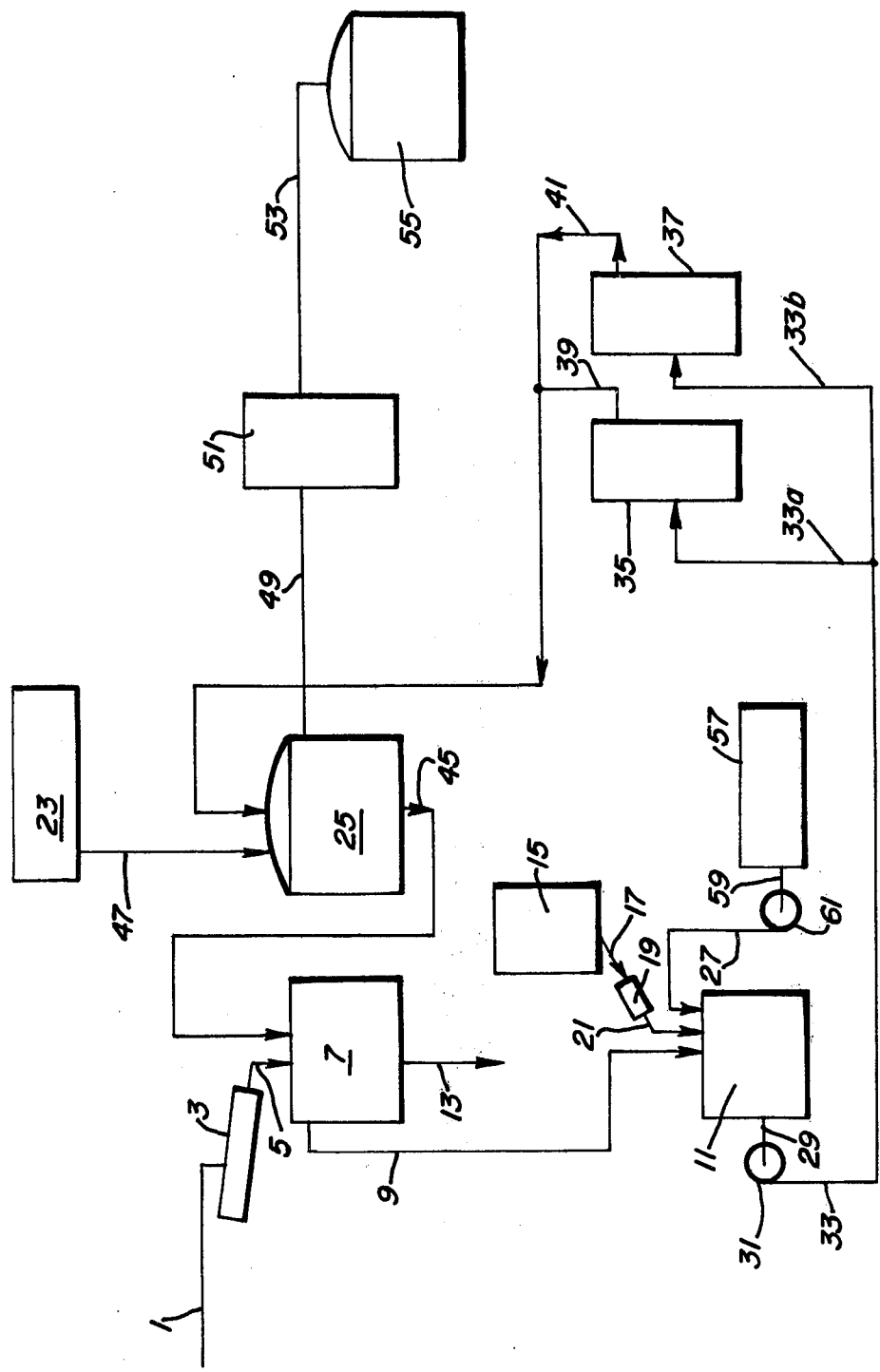

OXIDATION OF PHOSPHORIC ACID PLUS K COMPOUND ADDITION

The Hill process of which this invention is an improvement is described in U.S. Pat No. 4,110,422, and also in copending U.S. applications Ser. Nos. 54,446 filed July 3, 1979, now U.S. Pat. No. 4,248,846; 54,449 filed July 3, 1979; and 111,013 filed Jan. 10, 1980. The entire disclosures of said patents and said applications are incorporated herein by reference.

The Hill process includes several essential steps. A dilute phosphoric acid analyzing 22–46% $P_2O_5$ (more typically, 26–29%) is thoroughly clarified to the extent feasible. Then aluminum silicate is added thereto in an amount of about 1 to 40 pounds of aluminum silicate per ton of equivalent $P_2O_5$ in the acid. The aluminum silicate is preferably perlite. The acid is then concentrated, typically up to about 45–52% $P_2O_5$, and is then sent to a crystallizing-settling zone, where it is allowed to deposit crystals. The overflow stream, containing at most a small amount of crystals, can be taken as final product, or it can be further concentrated, e.g., up to 52–54% $P_2O_5$ for merchant grade acid or (preferably) up to 57–63% $P_2O_5$ to constitute the final product. The underflow stream from the crystallizer can be about 0.5–15 wt. % of the incoming feed to the crystallizer; preferably the range is 1–8%, and even more preferably it is 2–6%. Present commercial plant experience indicates 6% to be typical. This underflow stream contains in solution about the same percentage of $P_2O_5$ as in the feed to the crystallizer and about the same percentage of $P_2O_5$ as in the outgoing overflow stream. In addition it contains solids, and these solids may contain 10–45% $P_2O_5$, and 20–25% $P_2O_5$ is typical. The underflow stream may be used in making run-off-pile phosphate fertilizer or it may be returned to the acid train, as described in Ser. No. 54,446 above referenced.

The Hill process is at its best when the source phosphate rock contains not more than about 1.3% Fe as $Fe_2O_3$. This corresponds to an upper limit (as $Fe_2O_3/P_2O_5$) of about 4%. As the iron increases, the addition of sulfuric acid is beneficial, as disclosed in U.S. Ser. No. 54,446. As the Fe in the rock increases beyond 1.3%, e.g., say 1.5%, post-precipitation problems may be encountered even with addition of sulfuric acid. The instant invention is directed to resolution of the post-precipitation problem wherein the iron in the rock is in the area of 1.3 to 1.5% as $Fe_2O_3$, equivalent to a $Fe_2O_3/P_2O_5$ ratio in typical Hill feed acid of about 4.0–5.5%. Aside from feed rock, Fe may be introduced from extraneous sources into feed Hill acid to bring the Fe content (as $Fe_2O_3$) up to 1.3–1.5% in the acid, thereby resulting in the same $Fe_2O_3/P_2O_5$ ratio of 4.0–5.5% which this invention aims at dealing with. Such extraneous Fe may be partly or wholly in divalent form. To assist in post-precipitation control of such Hill acid, the instant invention calls for oxidation of 50–100 percent of the divalent iron in the feed acid, plus addition of a potassium compound in the Hill crystallizer.

Additional detail as to the oxidation step and the potassium compound addition step is given below.

In summary, my invention involves adding an oxidant at one stage in the Hill process, and a potassium-containing compound at another, to wit, in the Hill process comprising the steps:

(a) providing a clarified phosphoric acid feed containing about 22–46% phosphoric acid as $P_2O_5$ (preferably 26–29% $P_2O_5$); 1.3–1.5% Fe as $Fe_2O_3$; at least 15% of the Fe being present as divalent Fe;

(b) adding aluminum silicate to the clarified acid;

(c) concentrating the acid to a $P_2O_5$ content of about 45–52%;

(d) passing the concentrated acid to a crystallizing zone to provide a product stream and a stream containing most of the crystals produced in the crystallizing zone;

(e) further concentrating the product stream to a $P_2O_5$ content of about 57–63%.

My improvement comprises adding an oxidant to the clarified acid provided in Step (a), to oxidize most of the divalent Fe to trivalent Fe; and adding a potassium compound to the crystallizing zone.

The acid can be oxidized before or after the treatment with aluminum silicate. Preferably it is oxidized prior to such treatment.

U.S. Pat. No. 4,048,289 teaches phosphoric acid oxidation plus return of sediment to the digestion system. However, the process requires addition of active silica, e.g., diatomaceous earth, and the oxidation results in increasing solubility of iron and aluminum compounds, whereas the instant invention uses oxidation in such a way as to help precipitate iron and aluminum compounds as the phosphates. Further, the sediment returned in U.S. Pat. No. 4,048,289 is that in acid concentrated up to a point (42% $P_2O_5$) below that at which iron and aluminum phosphate precipitate (except in minor amounts). The sediment of sludge returned to the system in U.S. Pat. No. 4,048,289 is thus mostly gypsum and silico fluorides, in contrast to the instant sludge, the solids of which are $P_2O_5$-containing.

It is known that the addition of a potassium compound to phosphoric acid will precipitate "Compound K," $(Fe,Al)_3KH_{14}(PO_4)_8 \cdot 4H_2O$. See Kirk-Othmer, *Encyclopedia of Chemical Technology*, 2d Ed., vol. 9, p. 88, 1966. See also U.S. Pat. No. 3,338,675. However, it is believed that potassium addition following oxidation of $Fe^{++}$ to $Fe^{+++}$ in a Hill process was not known prior to this invention.

The drawing is a flow sheet showing application of the invention to a commercial scale Hill phosphoric acid process.

The flow sheet starts with the so-called Number One filtrate (typically 26–29% $P_2O_5$). The preceding steps are conventional in the wet-process phosphoric acid art and are omitted from the flow sheet. They include, e.g., reaction of phosphate rock with sulfuric acid to produce crude dilute phosphoric acid and byproduct gypsum. The latter is filtered, and the final product of these initial operations is the Number One filtrate.

The Hill process for control of post precipitation in phosphoric acid is well known. It is the subject of U.S. Pat. Nos. 4,110,422 and 4,164,550, and at this writing it is in commercial use in facilities operated by W. R. Grace & Co., in Bartow, Fla.

This invention is useful in cases where the weight ratio of total Fe (as $Fe_2O_3$) to $P_2O_5$ in the feed acid (line 1 in the drawing) is 0.04 or higher. Thus, in the rock in Example 1, total Fe as $Fe_2O_3$ is 1.28%, $P_2O_5$ is 30.1, and $Fe_2O_3/P_2O_5$ is 0.043, which value indicates that use of the invention will be useful in control of post-precipitation.

As practitioners in the art will note, such high Fe is rarely encountered in actual commercial practice. (A few phosphate rocks in Central Florida may from time to time produce acids with an Fe content as high as used here.)

The invention requires that at least 50% of the $Fe^{++}$ be oxidized to $Fe^{+++}$. For reasons that will appear hereinafter, this oxidation should be carried out before the potassium compound is added.

Referring now to the drawing, the incoming dilute feed acid enters the system via line 1. This acid is suitably the so-called No. 1 filtrate from the Prayon filter system in a wet process phosphoric acid reaction system. The No. 1 filtrate is well known to those skilled in the art and it contains typically phosphoric acid analyzing about 26–29% $P_2O_5$. The No. 1 filtrate is fed to launder 3, whence it exits via line 5 to clarifier 7. Clarifier 7 overflows via line 9 to perlite mix tank 11. The clarifier underflow exits via line 13 and is preferably returned to the reaction train, e.g., to a headbox, not shown. At 15 is shown the perlite storage container. This feeds via line 17 into perlite feeder 19 which exits via line 21 to mix tank 11. Oxidant line 27 also feeds into mix tank 11. At 57 is shown oxidant storage, which feeds via line 59 through metering pump 61 to line 27, which feeds to mix tank 11. Exit line 29 leads from mix tank 11 through pump 31, thence via line 33 to evaporator E at 35 and evaporator F at 37. It will be noted that line 33 branches into ine 33A proceeding to evaporator 35 and to 33B proceeding to evaporator 37. The concentrated product exiting from evaporator 35 exits via line 39 and that from evaporator 37 via line 41. Lines 39 and 41 join to form line 43 which feeds to crystallizer 25. Potassium compound addition vessel 23 feeds to crystallizer 25 via line 47. The underflow from crystallizer 25 exits via line 45 to the clarifier 7. Returning now to crystallizer 25 it will be noted that the overflow proceeds via line 49 to G-evaporator 51. Here the phosphoric acid is further concentrated, e.g., from about 50% up to about 60%. The final product exits via line 53 and is collected in product tank 55.

EXAMPLE 1

The process of the flowsheet is followed. The phosphate rock feed analyzes typically:

|  | Wt. % |
| --- | --- |
| $P_2O_5$ | 30.1 |
| CaO | 44.86 |
| $SiO_2$ | 10.24 |
| $Fe_2O_3$ | 1.28 |
| $Al_2O_3$ | 0.92 |
| F | 3.57 |
| $SO_4$ | 2.74 |
| $Na_2O$ | 0.61 |
| $K_2O$ | 0.11 |
| Total Fe | 0.92 |
| $Fe^{++}$ | 0.33 |

Perlite is used as the aluminum silicate at the rate of 16–20 pounds per ton of $P_2O_5$ in the acid in the perlite addition vessel.

25–50% hydrogen peroxide is used as the oxidant, at the rate of 0.3–0.45 lbs. of 100% $H_2O_2$/lb. of $Fe^{++}$ in the acid. Even more $H_2O_2$ can be used, but the gain in $Fe^{++}$ oxidation may not be economically worth it.

The resultant acid is concentrated to 47–51% $P_2O_5$, then sent to the crystallizer-settler. Fine ground potassium sulfate is added to the crystallizer. The amount added is based on the amount of Fe dissolved in the acid at this point, and is suitably about 0.5–1 moles of $K_2SO_4$ per three gram atoms of Fe in the acid. (This calculation is explained under "Potassium Addition," below.) The crystallizer underflow is returned to the clarifier and the overflow is concentrated to 58–60% $P_2O_5$, then sent to a holding tank, used to fill tank cars, with good post-precipitation control.

A typical analysis of the final product acid is:

|  | Wt. % |
| --- | --- |
| $P_2O_5$ | 59.1 |
| CaO | 0.10 |
| $SiO_2$ | 0.05 |
| $Fe_2O_3$ | 1.63 |
| $Al_2O_3$ | 1.65 |
| F | 0.61 |
| $H_2SO_4$ | 4.7 |
| Solids | 0.3 |
| $Na_2O$ | 0.08 |
| $K_2O$ | 0.27 |
| Total Fe | 1.63 |
| $Fe^{++}$ | 0.11 |

DIVALENT Fe

It might be supposed that all Fe in phosphate rock has had time to oxidize completely to $Fe^{+++}$ during the course of geologic time. Nevertheless, typical Florida rock carries a sensible amount of Fe as $Fe^{++}$, and this carries over into acid made from the rock. It has been theorized by others that accompanying organic matter reduces some of the $Fe^{+++}$ to $Fe^{++}$ in the rock and/or in the acid. Whatever the mechanism, $Fe^{++}$ is frequently found. Divalent Fe may also be introduced into Hill feed acid by deliberate addition in processing and returning a side stream of the acid.

THE OXIDATION STEP

As mentioned, a basic feature of this invention is oxidation of $Fe^{++}$ to $Fe^{+++}$ in a Hill phosphoric acid process as above defined, in cases of high iron as already described.

Oxidation is conveniently carried out in the same vessel to which the perlite or other aluminum silicate is added. It is evident that this additional step can be easily added to a conventional Hill operation with only minor modifications to the existing set-up.

In the example given, hydrogen peroxide is used as the oxidant. The stoichiometry assumed is

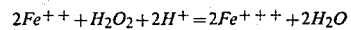

$$2Fe^{++} + H_2O_2 + 2H^+ = 2Fe^{+++} + 2H_2O$$

Other oxidants can be used, e.g., nitric acid, potassium permanganate, ozone; sodium dichromate; chlorine or sodium hypoclorite, chlorates, potassium bromate and the like, also air and/or oxygen (preferably under pressure).

The amount of oxidant should be at least 100% of that required to oxidize all $Fe^{++}$ to $Fe^{+++}$. Numerically, this means at least 0.304 lbs. of $H_2O_2$ per pound of divalent Fe. It is often desirable to use a stoichiometric excess of oxidant, e.g., 50% in the case of $H_2O_2$.

The oxidant materials can be used in various concentrations. Various concentrations of $H_2O_2$ are available, ranging from 3 to 98% (aqueous). The major grades sold by producers are 35, 50, 70, and 90% $H_2O_2$. These are all suitable; 25 or 50% is preferred.

POTASSIUM ADDITION

The amount of potassium compound to be added to the crystallizer is determined by the amount of $Fe^{+++}$ and Al$^{+++}$ present. At least sufficient potassium compound should be present to precipitate the above mentioned "Compound K", namely:

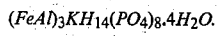

$(FeAl)_3KH_{14}(PO_4)_8 \cdot 4H_2O$.

The Fe is trivalent (which, of course, explains the preceding oxidation step). Thus, at least 1-gm. atom weight of K is required per 3 gm. atom weights of Fe. For example, at least 39 g. contained K is required per 167.5 g. contained Fe. Actually, since Fe is replaceable in Compound K by Al, it is better to double this minimum amount of K.

Minuscule amounts of K (reported as $K_2O$) in the feed rock and possibly in perlite may be taken account of in calculating the amount of potassium compound to be added.

As noted, in the above Example the atomic ratio of K (in $K_2SO_4$) to (Fe+Al (in the acid) was 1-2 to 6. There is a broader operable range, namely 1-4 to 6. On another basis, 0.17-0.33 moles of potassium sulfate can be used per mole or gram-atom of Fe$^{+++}$. Suitably, at least 0.7 pounds of $K_2SO_4$ are used per pound of total Fe$^{+++}$ plus Al$^{+++}$.

The potassium compound should, of course, be soluble under the conditions obtaining in the crystallizer, i.e., in a 50% $P_2O_5$ acid at about 75° C. This class of compounds will be evident to those skilled in the art. For example, substantially all the water-soluble potassium compounds are applicable, typically $K_2SO_4$
KCl
$K_2B_4O_7 \cdot 5H_2O$
$K_2CO_3$
KOH
$K_2HPO_4$
$K_2SiO_3$.

KCl may, however, be expected to be somewhat corrosive, and $K_2CO_3$ may generate $CO_2$ which will cause frothing. Aside from this, they both work.

Also, various potassium compounds, though difficultly water-soluble, dissolve in 50% $P_2O_5$ Hill acid under certain conditions. For example, orthoclase, microcline, nepheline, and similar K-containing minerals. Preferably, they are added as fine-ground powders. Such materials should, of course, be relatively Fe and Al-free; which is to say, that the total Fe+Al atoms in the additive should be less than 3 times the number of K atoms, since otherwise if Compound K is formed, it will not remove pre-existing Fe/Al from the acid.

CRYSTALLIZER UNDERFLOW

Sending crystallizer underflow to the clarifier is conventional in the practice of the Hill process, as described in R. N. Hill's copending application U.S. Ser. No. 54,446, filed July 3, 1979. As shown in that application, sludge from the crystallizer, when sent to the clarifier, drops most of its solids to the bottom of the clarifier, where they leave with normal clarifier solids. The liquid portion of the crystallizer sludge is approximately 50% $P_2O_5$ acid, and this very valuable portion of the crystallizer underflow is recovered in the clarifier, where it may serve to increase the $P_2O_5$ content of the clarifier acid by a full percentage point or more, thereby saving the energy expended in initially evaporating that amount of acid to 50% or thereabouts. Preferably, crystallizer sludge return is used in the instant invention. There is no solids buildup, because solids from the system as described in the drawing (clarifier underflow, line 13) go back to the headbox in the acid/rock reaction train, and to the extent they are not finally dissolved, they are collected in the gypsum filter cake.

ANALYTICAL

Except for solids and iron, analyses were made by procedures in "Methods Used and Adopted by the Association of Florida Phosphate Chemists," Fifth Ed., 1970 ("AFPC"). Where more than one method is provided, the selections were as follows:

P, Photometric method (phosphate rock), p. 80.
Aluminum oxide, Atomic absorption method, p. 95.
F. Specific ion electrode method, p. 104A.
Water, Karl Fischer method, p. 127.
Phosphoric acid in phosphoric acid, Total phosphoric acid method, p. 132.

Solids were determined by the following procedure:

APPARATUS a. Vacuum filtration system
b. Drying oven adjusted to 105° C.
c. Gooch crucible, porcelain, with perforated bottom

REAGENTS a. Asbestos—Powminco brand or equivalent, special for Gooch crucibles, acid washed. This grade asbestos as received should be thick slurried with water and blended in a Waring blender or equivalent for 10 seconds. The blended slurry should then be placed in an Erlenmeyer flask and washed 3-5 times by adding distilled water and decanting to remove the extremely fine material. The washing is accomplished by thoroughly shaking the blended asbestos with each water wash and then allowing it to settle for 5-10 minutes before decantation of the excess water and fine material.

b. Methanol, absolute.

DETERMINATION

Prepare the Gooch crucible with a pad of asbestos which filters freely under medium suction. (In lieu of asbestos, glass fibers can be used.) Pad should be thick enough to retain all suspended solids. Wash pad several times with distilled water, finally with methanol, and place in drying oven at 105° C. for a minimum of one hour. Remove from drying oven and place in desiccator until cool. Reject or rework crucibles which visually show evidence of pad separation from crucible walls. Weigh crucible rapidly and record tare weight. Resuspend solids in sample by shaking thoroughly. Immediately weigh approximately five-ten grams of sample, accurately weighed, into the crucible. Place the crucible and contents on a filter flask and filter with strong vacuum until *all* of the liquid portion has been filtered through. Wash the solids five times with five ml portions of methanol allowing each wash to filter through completely. Remove crucible from suction and place in the drying oven at 105° C. for a minimum of one hour. Cool in desiccator and weigh rapidly as soon as cool.

$$\% \text{ Suspended Solids} = \frac{\text{Weight of Residue}}{\text{Weight of Sample}} \times 100$$

In these analyses, samples are well shaken, then immediately analyzed. Thus, values for $P_2O_5$, lime, silica, iron, alumina, etc. include components in both liquid and solid phases.

Ferrous and ferric iron were determined by the following procedure:

REAGENTS a. Standard Potassium Dichromate

A 0.1 N. solution is made by dissolving 4.904 grams and diluting to one liter with distilled water.

b. Stannous Chloride

Sixty grams of the crystallized salt is dissolved in 600 ml of concentrated HCl and made up to 1 liter with distilled water.

c. Phosphoric Acid - Sulfuric Acid Mixture 150 ml concentrated $H_2SO_4$ and 150 ml concentrated $H_3PO_4$ are diluted to 1 liter with distilled water.

d. Mercuric Chloride

A saturated solution of $HgCl_2$ (60–70 grams per liter) is made.

e. Diphenylamine

One gram of diphenylamine is dissolved in 100 ml of $H_2SO_4$.

DETERMINATION

A 5.00 gram sample of acid is weighed into a 250 ml beaker. About 100 ml of distilled water is added to the beaker. Then 15 ml of the phosphoric-sulfuric acid mixture and 4 drops of diphenylamine are added. The solution is stirred and potassium dichromate is added drop by drop until a deep purple color develops. The milliliters of potassium dichromate is recorded and used in the calculation for ferrous iron.

A total iron is run by weighing out 5.00 grams into a 250 ml beaker, adding 25 ml of 1:1 HCl and about one ml of 2% potassium permanganate solution, placing this on the hot plate and boiling until the color of permanganate is destroyed. The iron is then reduced by adding stannous chloride drop by drop until the solution is colorless. Add one-two drops in excess. The solution is allowed to cool to room temperature. The solution is diluted to 100 ml and 15 ml saturated mercuric chloride is added. Add 15 ml of phosphoric-sulfuric acid mixture and 4 drops of diphenylamine indicator. Potassium dichromate is added drop by drop to the stirred solution until a deep purple end point develops.

Calculation:

$$\% \text{ Ferrous Iron} = \frac{\text{ml Titration for Ferrous}}{\text{wt of sample}} \times .005585 \times 100$$

$$\% \text{ Total Iron} = \frac{\text{ml Titration for total}}{\text{wt of sample}} \times .005585 \times 100$$

$$\% \text{ Ferric Iron} = \% \text{ Total Iron} - \% \text{ Ferrous Iron}$$

I claim:

1. In the process of preparing wet process phosphoric acid with low post-precipitation characteristics, said process comprising the steps:
    (a) providing a clarified phosphoric acid feed containing about 22–46% phosphoric acid as $P_2O_5$; 1.3–1.5% Fe as $Fe_2O_3$; at least 15% of the Fe being present as divalent Fe;
    (b) adding aluminum silicate to the clarified acid in an aluminum silicate addition zone;
    (c) concentrating the acid to a $P_2O_5$ content of about 45–52%;
    (d) passing the concentrated acid to a crystallizing zone to provide a product stream and a stream containing most of the crystals produced in the crystallizing zone;
    (e) further concentrating the product stream to a $P_2O_5$ content of about 57–63%;
    the improvement comprising adding an oxidant to the clarified acid provided in Step (a), to oxidize most of the divalent Fe to trivalent Fe; and adding a potassium compound to the crystallizing zone in an amount effective to precipitate $(Fe,Al)_3KH_{14}(PO_4)_8 \cdot 4H_2O$.

2. Method according to claim 1 in which the oxidant is hydrogen peroxide.

3. Method according to claim 1 in which the potassium compound is potassium sulfate.

4. Method according to claim 3 in which the potassium sulfate is added in an amount within the range of 0.17–0.33 moles of potassium sulfate per mole of contained $Fe^{+++}$ in the acid in the crystallizing zone.

5. Method according to claim 1 in which the oxidant is added to the aluminum silicate addition zone in step (a).

6. Method according to claim 1 in which the oxidant is a member selected from the group consisting of hydrogen peroxide, ozone, nitric acid, potassium permanganate, air, and oxygen.

7. Method according to claim 6 in which the oxidant is a member selected from the group consisting of air, oxygen, and mixtures thereof.

8. Method according to claim 6, in which the oxidant is hydrogen peroxide.

9. Method according to claim 1 in which the potassium compound is a member of the group consisting of the sulfate, chloride, tetraborate, carbonate, hydroxide, monohydrogen phosphate, or silicate of potassium.

10. Method according to claim 9 in which the potassium compound is potassium sulfate.

11. Method according to claim 10 in which at least about 0.7 lbs. of potassium sulfate are added per pound of total $Fe^{+++}$ plus $Al^{+++}$ in the acid.

* * * * *

UNITED STATES PATENT AND TRADEMARK OFFICE
CERTIFICATE OF CORRECTION

PATENT NO. : 4 301 131
DATED : 17 November 1981
INVENTOR(S) : M. G. Sanchez

It is certified that error appears in the above-identified patent and that said Letters Patent are hereby corrected as shown below:

In Claim 5, last line.

"(a)" should read --(b)--.

Signed and Sealed this

*Second* Day of *February 1982*

[SEAL]

Attest:

Attesting Officer

GERALD J. MOSSINGHOFF
*Commissioner of Patents and Trademarks*